United States Patent
Hsu et al.

(10) Patent No.: US 11,128,218 B2
(45) Date of Patent: Sep. 21, 2021

(54) ADAPTIVE FREQUENCY ADJUSTING SYSTEM

(71) Applicant: ANPEC ELECTRONICS CORPORATION, Hsinchu (TW)

(72) Inventors: Chun-Kai Hsu, Hsinchu (TW); Chih-Heng Su, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 85 days.

(21) Appl. No.: 16/811,059

(22) Filed: Mar. 6, 2020

(65) Prior Publication Data
US 2021/0159789 A1    May 27, 2021

(30) Foreign Application Priority Data
Nov. 27, 2019  (TW) ................................. 108143046

(51) Int. Cl.
*H02M 3/158*    (2006.01)
*H02M 1/08*    (2006.01)

(52) U.S. Cl.
CPC ............. *H02M 3/158* (2013.01); *H02M 1/08* (2013.01)

(58) Field of Classification Search
CPC .... H02M 1/0003; H02M 1/0006; H02M 1/08; H02M 1/088; H02M 1/38; H02M 3/158; H02M 3/1588; Y02B 70/10
See application file for complete search history.

(56) References Cited

U.S. PATENT DOCUMENTS

| | | | | |
|---|---|---|---|---|
| 7,230,406 B2* | 6/2007 | Huang | .................. | H02M 3/158 323/222 |
| 9,093,909 B2* | 7/2015 | Wang | ................ | H02M 3/33507 |
| 9,584,019 B2* | 2/2017 | Shiwaya | ............... | H02M 3/158 |
| 2015/0162829 A1* | 6/2015 | Chiu | ..................... | H02M 3/156 323/271 |
| 2017/0070149 A1* | 3/2017 | Guan | ...................... | H02M 1/32 |
| 2018/0321702 A1* | 11/2018 | Chen | ...................... | G05F 3/262 |

* cited by examiner

*Primary Examiner* — Matthew V Nguyen
(74) *Attorney, Agent, or Firm* — Li & Cai Intellectual Property (USA) Office

(57) ABSTRACT

An adaptive frequency adjusting system is provided. An error amplifier outputs an error amplified signal according to an output voltage of a power converter and a reference voltage. When a comparator determines that a voltage of a slope signal reaches a voltage of the error amplified signal within a maximum on-time of an upper bridge switch, the comparator outputs a reset signal. When the comparator determines that the voltage of the slope signal fails to reach the voltage of the error amplified signal and the maximum on-time ends, the comparator outputs the reset signal and instructs a clock generator to output a clock signal having a lower frequency. A driver circuit turns off the upper bridge switch and turns on a lower bridge switch according to the reset signal, and drives the upper bridge switch based on the clock signal having the lower frequency.

6 Claims, 4 Drawing Sheets

ADAPTIVE FREQUENCY ADJUSTING SYSTEM

CROSS-REFERENCE TO RELATED PATENT APPLICATION

This application claims the benefit of priority to Taiwan Patent Application No. 108143046, filed on Nov. 27, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a frequency adjusting system, and more particularly to an adaptive frequency adjusting system.

BACKGROUND OF THE DISCLOSURE

In recent years, with the advancement of technology, electronic products with various functions have been gradually developed. These electronic products can meet different requirements and have become an indispensable part of people's daily lives, making people's lives more convenient. The various electronic products are composed of various electronic components, and each of the electronic components requires different power supply voltages. Therefore, in order to make the electronic products function properly, a power convertor circuit needs to convert an input voltage into an appropriate voltage to be supplied to the electronic components.

SUMMARY OF THE DISCLOSURE

In response to the above-referenced technical inadequacies, the present disclosure provides an adaptive frequency adjusting system for a power converter having a high duty ratio. The power converter includes a control circuit, a driver circuit, an upper bridge switch, a lower bridge switch, an error amplifier, and a first comparator. The driver circuit is connected to the control circuit, the upper bridge switch and the lower bridge switch. One terminal of an inductor is connected between the upper bridge switch and the lower bridge switch. Another terminal of the inductor is grounded through a capacitor. The error amplifier is connected to a node between the capacitor and the inductor. The error amplifier multiplies a difference between a voltage of the capacitor and a reference voltage by a gain to output an error amplified signal. The first comparator is connected to the error amplifier to compare the error amplified signal with a slope signal to output a comparing signal. The adaptive frequency adjusting system includes a clock generator and a second capacitor. The clock generator is connected to the control circuit. The clock generator is configured to output a clock signal having a preset frequency to the control circuit and reduce a frequency of the clock signal according to a frequency reducing signal. The control circuit controls the upper bridge switch or the lower bridge switch according to the frequency of the clock signal. The second capacitor is connected to the clock generator, the first comparator and the control circuit. When the second capacitor determines that a voltage of the slope signal reaches a voltage of the error amplified signal within a maximum on-time of the upper bridge switch according to the comparing signal, the second capacitor outputs a reset signal to the control circuit. When the second capacitor determines that the voltage of the slope signal fails to reach the voltage of the error amplified signal and the maximum on-time of the upper bridge switch ends according to the comparing signal, the second capacitor determines that a duty ratio of an input voltage of the upper bridge switch to a voltage of the node reaches a maximum duty ratio of the frequency of the clock signal, and the second capacitor outputs the reset signal to the control circuit and the frequency reducing signal to the clock generator at an end point of the maximum on-time. The reset signal instructs the control circuit to control the driver circuit to turn off the upper bridge switch and turn on the lower bridge switch.

In certain embodiments, the power converter further includes a voltage divider circuit. The voltage divider circuit is connected between the error amplifier and the capacitor. The voltage divider divides the voltage of the capacitor to generate a feedback voltage. The error amplifier multiplies a difference between the feedback voltage and the reference voltage by a gain to output the error amplified signal.

In certain embodiments, the control circuit outputs a pulse width modulation signal according to the clock signal to control the upper bridge switch or the lower bridge switch.

In addition, the present disclosure provides an adaptive frequency adjusting system for a power converter having a high duty ratio. The power converter includes a control circuit, a driver circuit, an upper bridge switch, a lower bridge switch, an error amplifier, and a first comparator. The driver circuit is connected to the control circuit, the upper bridge switch and the lower bridge switch. One terminal of an inductor is connected between the upper bridge switch and the lower bridge switch. Another terminal of the inductor is grounded through a capacitor. The error amplifier is connected to a node between the capacitor and the inductor. The error amplifier multiplies a difference between a voltage of the capacitor and a reference voltage by a gain to output an error amplified signal. The first comparator is connected to the error amplifier to compare the error amplified signal with a slope signal to output a comparing signal. The adaptive frequency adjusting system includes an on-time generator circuit, a falling edge detector circuit and a second comparator. The on-time generator circuit is connected to the first comparator and configured to determine an on-time of the upper bridge switch to output an upper bridge conducting signal according to the comparing signal. The falling edge detector circuit is connected to the on-time generator circuit and the control circuit. The falling edge detector circuit is configured to output a reset signal at a time point of a falling edge of the upper bridge conducting signal for instructing the control circuit to control the driver circuit to turn off the upper bridge switch and turn on the lower bridge switch. The second comparator is connected to the first comparator, the falling edge detector circuit and the on-time generator circuit. When the second capacitor determines that the voltage of the error amplified signal reaches the voltage of the slope signal within a minimum off-time starting from a falling edge of the upper-bridge conducting signal according to the comparing signal, the second capacitor determines that a duty ratio of an input voltage received by the upper bridge switch to the voltage of the capacitor reaches a maximum duty ratio, and outputs an on-time extending signal for instructing the on-time generator circuit to extend the on-time.

In certain embodiments, the adaptive frequency adjusting system further includes an off-time detector circuit. The off-time detector circuit is connected to the falling edge detector circuit and the second comparator. The off-time detector circuit is configured to detect the minimum off-time of the upper-bridge conducting signal and provide the minimum off-time to the second comparator.

In certain embodiments, the power converter further includes a voltage divider circuit. The voltage divider circuit is connected between the error amplifier and the capacitor. The voltage divider divides the voltage of the capacitor to generate a feedback voltage. The error amplifier multiplies a difference between the feedback voltage and the reference voltage by a gain to output the error amplified signal.

As described above, the present disclosure provides the adaptive frequency adjusting system, which can adaptively adjust the frequency of the power converter to improve an issue associated with the conventional power converter, a frequency of which is fixed and cannot be adjusted. For example, the conventional power converter having a high fixed frequency is limited in a high duty cycle application. An output voltage of the conventional power converter having a low fixed frequency has poor stability and larger ripples.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
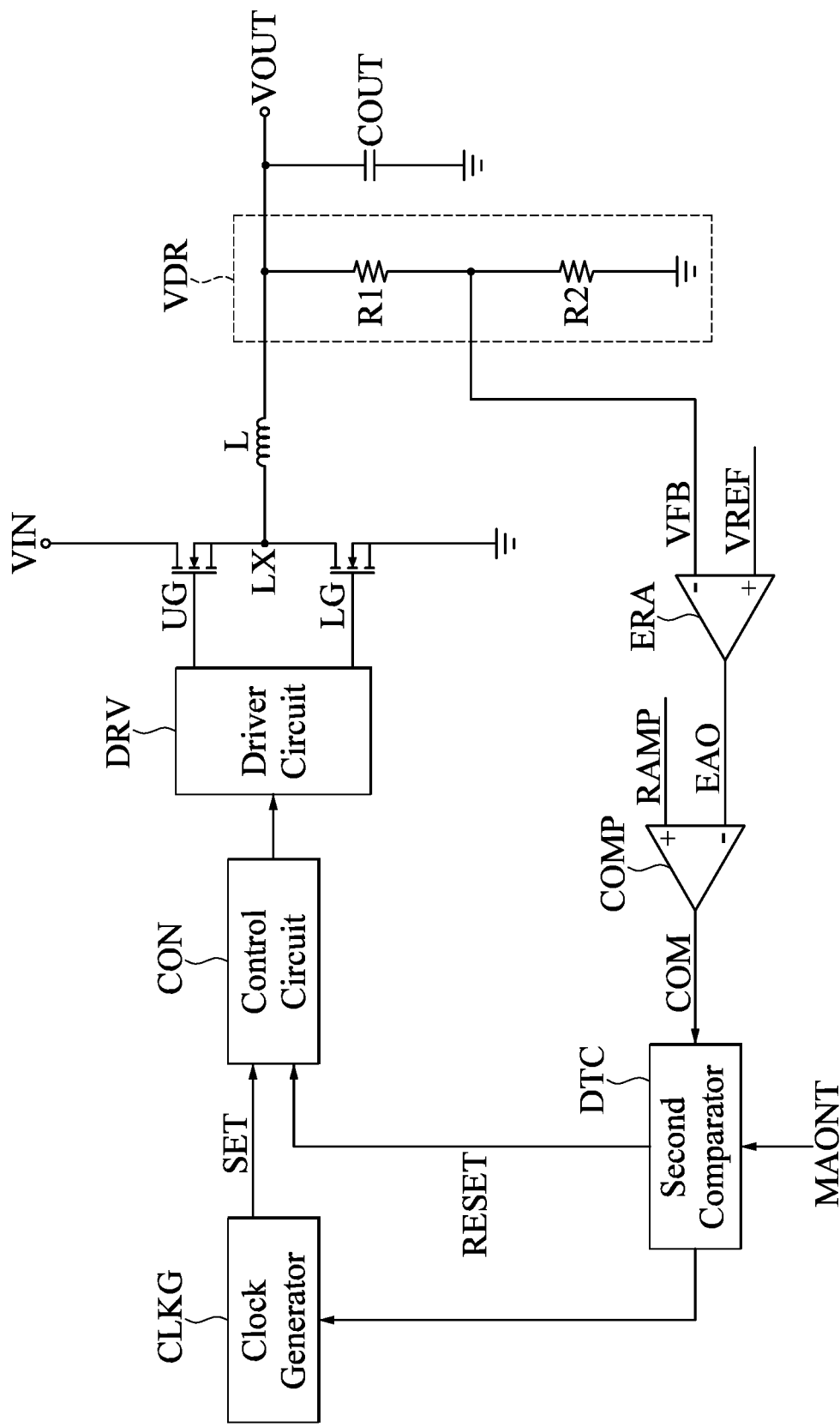
FIG. 1 is a circuit layout circuit diagram of an adaptive frequency adjusting system according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
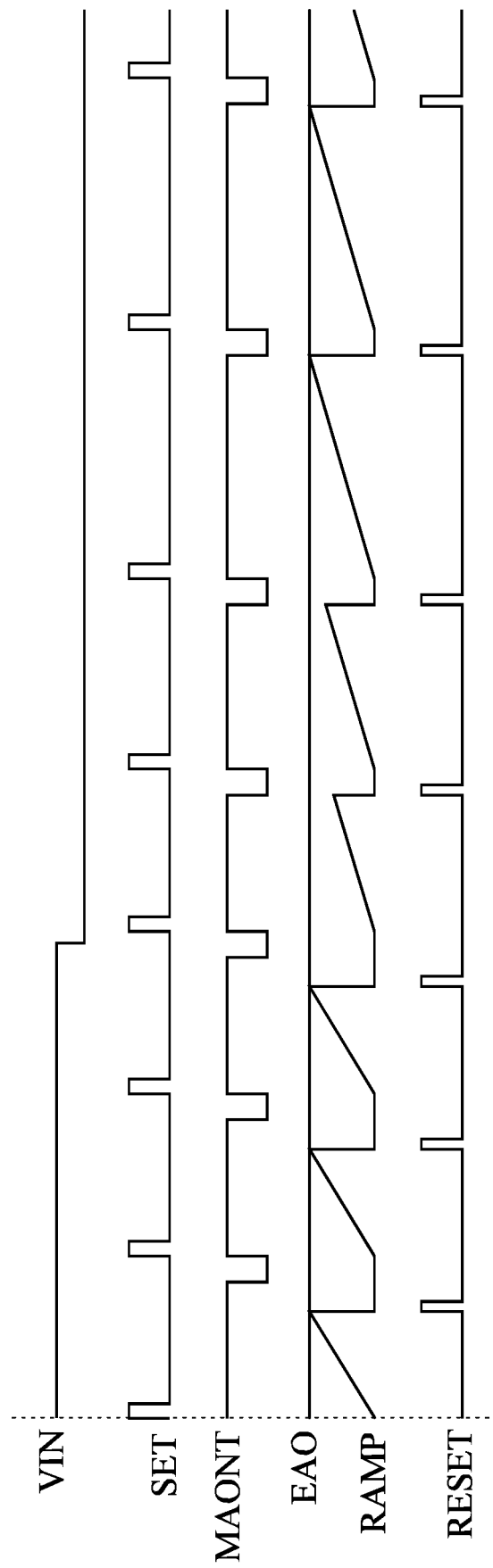
FIG. 2 is a signal waveform diagram of the adaptive frequency adjusting system according to the first embodiment of the present disclosure.

Reference is made to FIGS. 1 and 2, which are respectively a circuit layout circuit and a signal waveform diagram of an adaptive frequency adjusting system according to a first embodiment of the present disclosure.

As shown in FIG. 1, in the embodiment, the adaptive frequency adjusting system includes a clock generator CLKG and a second comparator DTC, which is applicable for a power converter. The power converter includes a control circuit CON, a driver circuit DRV, an upper bridge switch UG, a lower bridge switch LG, an error amplifier ERA and a first comparator COMP.

The clock generator CLKG is connected to the control circuit CON. The driver circuit DRV is connected to the control circuit CON, the upper bridge switch UG and the lower bridge switch LG. The adaptive frequency adjusting system of the embodiment applies a fixed frequency mechanism. First, the clock generator CLKG outputs a clock signal SET having a preset frequency to the control circuit CON. The control circuit CON outputs a control signal to the driver circuit DRV to control the driver circuit DRV to turn on the upper bridge switch UG and turn off the lower bridge switch LG based on the preset frequency of the clock signal SET. For example, the control signal may be a pulse width modulation signal.

One terminal of an inductor L is connected to a node LX between the upper bridge switch UG and the lower bridge switch LG. Another terminal of the inductor L is grounded through a capacitor COUT. A first amplification input terminal such as an inverting input terminal of the error amplifier ERA is connected to a node between the capacitor COUT and the inductor L. In addition, a second amplification input terminal such as a non-inverting input terminal of the error amplifier ERA is connected to a reference voltage source. The error amplifier ERA multiplies a difference between a voltage VOUT of the capacitor COUT (that is an output voltage of the power converter) and a reference voltage VREF of the reference voltage source by a gain to output an error amplified signal EAO.

Optionally, a voltage driver circuit VDR is disposed between the error amplified signal EAO and the capacitor COUT. The voltage driver circuit VDR includes a first resistor R1 and a second resistor R2. The first amplification input terminal of the error amplifier ERA is connected to a node between the first resistor R1 and the second resistor R2. The voltage driver circuit VDR divides the voltage VOUT to generate a feedback voltage VFB. The error amplifier ERA multiplies a difference between the feedback voltage VFB and the reference voltage VREF by a gain to output the error amplified signal EAO.

A first comparison input terminal such as a non-inverting input terminal of the first comparator COMP is connected to a slope signal generator (not shown in figures) and receives a slope signal RAMP from the slope signal generator. In addition, a second comparison input terminal such as an inverting input terminal of the first comparator COMP is connected to an output terminal of the error amplifier ERA and receives the error amplified signal EAO from the error amplifier ERA.

The second comparator DTC is connected to the first comparator COMP, the clock generator CLKG and the control circuit CON. When an input voltage VIN received by the upper bridge switch LG of the power converter shown in FIG. 1 is high as shown in FIG. 2, a voltage of the slope signal RAMP can increase to reach a voltage of the error amplified signal EAO from a low voltage during a working period of a maximum on-time signal MAONT. When the first comparator COMP determines that the voltage of the slope signal RAMP is equal to or higher than the voltage of the error amplified signal EAO, the first comparator COMP outputs a comparing signal COM at a low level to the second comparator DTC.

When the second comparator DTC determines that the voltage of the slope signal RAMP increases to reach the voltage of the error amplified signal EAO from the low voltage, within a maximum on-time of the upper bridge switch UG, for example, during the working period of the maximum on-time signal MAONT as shown in FIG. 2, according to the comparing signal COM at the low level, the second comparator DTC outputs a reset signal RESET to the control circuit CON. The reset signal RESET instructs the control circuit CON to output the control signal for controlling the driver circuit DRV to turn off the upper bridge switch UG and turn on the lower bridge switch LG. For example, the control signal may be a pulse width modulation signal.

It is worth noting that, when the input voltage VIN received by the upper bridge switch LG of the power converter shown in FIG. 1 is low as shown in FIG. 2, the voltage of the slope signal RAMP cannot increase to reach the voltage of the error amplified signal EAO during the working period of the maximum on-time signal MAONT. Under this condition, when the first comparator CMP determines that the voltage of the slope signal RAMP is lower than the voltage of the error amplified signal EAO, the first comparator CMP outputs the comparing signal COM at a high level to the second comparator DTC.

When the second comparator DTC determines that the voltage of the slope signal RAMP fails to reach the voltage of the error amplified signal EAO and the maximum on-time signal MAONT ends at a time point of a falling edge of the maximum on-time signal MAONT as shown in FIG. 2 according to the comparing signal COM, the second comparator DTC determines that a duty ratio of the input voltage VIN of the power converter to the output voltage VOUT of the power converter reaches a maximum duty ratio of a frequency of the clock signal SET. The output voltage VOUT of the power converter is a voltage at the node between the capacitor COUT and the inductor L.

When the duty ratio of the power converter reaches the maximum duty ratio, the second comparator DTC outputs the reset signal RESET to the control circuit CON and outputs a frequency reducing signal to the clock generator CLKG at an end point of the maximum on-time. The control circuit CON controls the driver circuit DRV to turn off the upper bridge switch UG and turn on the lower bridge switch LG according to the reset signal RESET. The clock generator CLKG reduces the frequency of the clock signal SET to be outputted to the control circuit CON according to the frequency reducing signal.

As shown in FIG. 2, after the frequency of the clock signal SET is reduced, a frequency of switching the upper bridge switch UG and the lower bridge switch LG is reduced such that an on-time of the upper bridge switch UG is extended, that is, the working period of the maximum on-time signal MAONT is extended. As a result, under a condition that the input voltage VIN received by the power converter is low, a voltage of a ramp signal RAMP can gradually rise from a low voltage to reach the voltage of the error amplified signal EAO during the extended working period of the maximum on-time signal MAONT.

Figure 3:
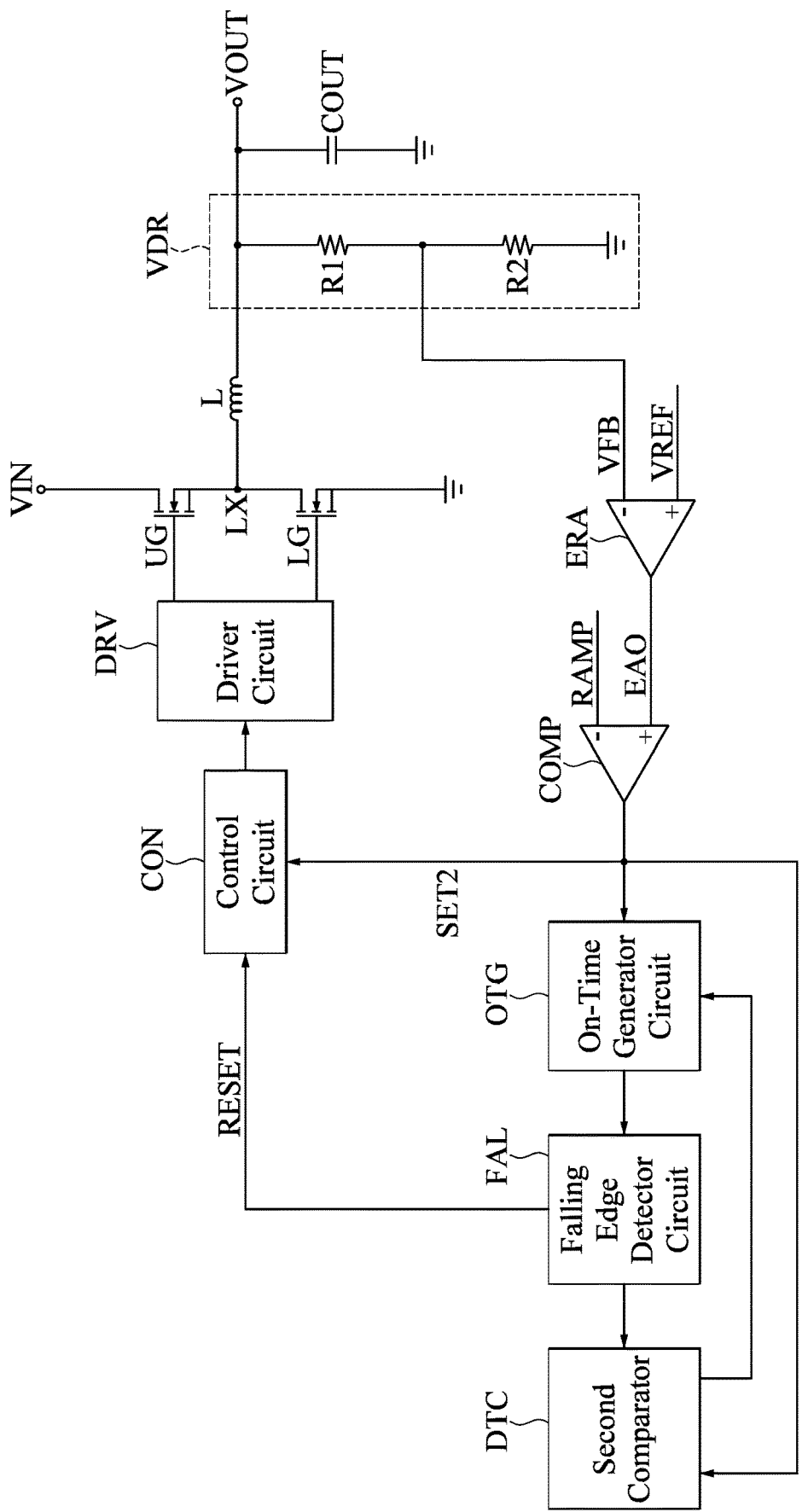
FIG. 3 is a circuit layout circuit diagram of an adaptive frequency adjusting system according to a second embodiment of the present disclosure.
Figure 4:
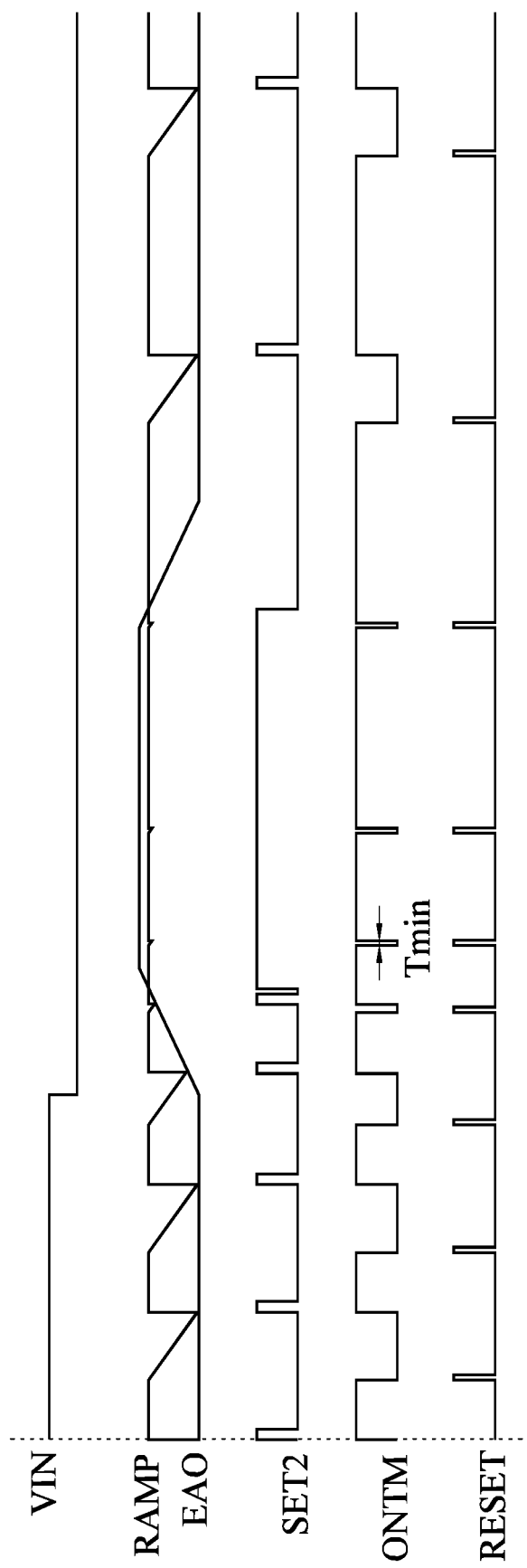
FIG. 4 is a signal waveform diagram of the adaptive frequency adjusting system according to the second embodiment of the present disclosure.

Reference is made to FIGS. 3 and 4, which are respectively a circuit layout circuit and a signal waveform diagram of an adaptive frequency adjusting system according to a second embodiment of the present disclosure. A difference between the first and second embodiments is that, a fixed frequency mechanism of providing the clock signal SET having a preset frequency by the clock generator CLKG is applied in the first embodiment. However, the fixed frequency mechanism is not applied in the second embodiment, as specifically described below.

In the embodiment, the adaptive frequency adjusting system includes an on-time generator circuit OTG, a falling edge detector circuit FAL and a second comparator DTC, which are applicable for the power converter. The power converter includes the control circuit CON, the driver circuit DRV, the upper bridge switch UG, the lower bridge switch LG, the error amplifier ERA and the first comparator COMP.

The driver circuit DRV is connected to the control circuit CON, the upper bridge switch UG and the lower bridge switch LG. One terminal of the inductor L is connected to the node LX between the upper bridge switch UG and the lower bridge switch LG. Another terminal of the inductor L is grounded through the capacitor COUT. The first amplification input terminal such as the inverting input terminal of the error amplifier ERA is connected to the node between the capacitor COUT and the inductor L. In addition, the second amplification input terminal such as the non-inverting input terminal of the error amplifier ERA is connected to the reference voltage source. The error amplifier ERA multiplies the difference between the voltage VOUT of the capacitor COUT (that is the output voltage of the power converter) and the reference voltage VREF of the reference voltage source by the gain to output the error amplified signal EAO.

Optionally, the voltage driver circuit VDR is disposed between the error amplified signal EAO and the capacitor COUT. The voltage driver circuit VDR includes the first resistor R1 and the second resistor R2. The first amplification input terminal of the error amplifier ERA is connected to the node between the first resistor R1 and the second resistor R2. The voltage driver circuit VDR divides the voltage VOUT to generate the feedback voltage VFB. The error amplifier ERA multiplies the difference between the feedback voltage VFB and the reference voltage VREF by a gain to output the error amplified signal EAO.

A first comparison input terminal such as the non-inverting input terminal of the first comparator COMP is connected to the slope signal generator (not shown in figures) and receives the slope signal RAMP from the slope signal generator RAMP. In addition, the second comparison input terminal such as the inverting input terminal of the first comparator COMP is connected to the output terminal of the error amplifier ERA and receives the error amplified signal EAO from the error amplifier ERA.

The first comparator COMP compares the voltage of the error amplified signal EAO with the voltage of the slope signal RAMP from the slope signal generator to output the comparing signal. The control circuit CON controls the driver circuit DRV to turn on the upper bridge switch UG and turn off the lower bridge switch LG according to the comparing signal taken as a set signal SET2.

The on-time generator circuit OTG is connected to the first comparator COMP and the falling edge detector circuit FAL. The on-time generator circuit OTG determines the on-time of the upper bridge switch UG to output an upper bridge conducting signal ONTM as shown in FIG. 4 according to the comparing signal of the first comparator COMP.

The falling edge detector circuit FAL is connected to the on-time generator circuit OTG and the control circuit CON. The falling edge detector circuit FAL is configured to receive the upper bridge conducting signal ONTM from the on-time generator circuit OTG and detect a falling edge of the upper bridge conducting signal ONTM to output a falling edge detecting signal. The falling edge detector circuit FAL is configured to output the reset signal RESET at a time point of the falling edge of the upper bridge conducting signal ONTM to instruct the control circuit CON to control the driver circuit DRV to turn off the upper bridge switch UG and turn on the lower bridge switch LG.

When the input voltage VIN received by the power converter is low such that the voltage of the error amplified signal EAO gradually increases to be higher than the voltage of the ramp signal RAMP, the first comparator COMP outputs the comparing signal at a high level.

The second comparator DTC is connected to the first comparator COMP, the falling edge detector circuit FAL and the on-time generator circuit OTG. The second comparator DTC determines a minimum off-time Tmin starting from the falling edge of the upper bridge conducting signal ONTM according to the falling edge detecting signal of the falling edge detector circuit FAL. Alternatively, an off-time detector circuit is disposed between the falling edge detector circuit FAL and the second comparator DTC. The off-time detector circuit is configured to detect the minimum off-time Tmin of the upper-bridge conducting signal ONTM and provide the minimum off-time Tmin to the second comparator DTC.

It is worth noting that, when the second capacitor DTC determines that the voltage of the error amplified signal reaches the voltage of the slope signal RAMP within the minimum off-time according to the comparing signal at the high level, the second capacitor DTC determines that the duty ratio of the input voltage VIN of the power converter to the output voltage VOUT (that is the voltage of the capacitor COUT) reaches the maximum duty ratio, and the second capacitor DTC outputs an on-time extending signal.

The on-time generator circuit OTG extends the working period of the upper-bridge pilot signal ONTM according to the on-time extending signal of the second comparator DTC. As a result, a time point at which the falling edge detector circuit FAL outputs the reset signal RESET is delayed so as to extend the on-time of the upper bridge switch UG. Therefore, an effect of reducing a frequency of the power converter is equivalently achieved.

In summary, the present disclosure provides the adaptive frequency adjusting system, which can adaptively adjust the frequency of the power converter to improve an issue associated with the conventional power converter, a frequency of which is fixed and cannot be adjusted. For example, the conventional power converter having a high fixed frequency is limited in a high duty cycle application. An output voltage of the conventional power converter having a low fixed frequency has poor stability and larger ripples.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adaptive frequency adjusting system for a power converter having a high duty ratio, wherein the power converter includes a control circuit, a driver circuit, an upper bridge switch, a lower bridge switch, an error amplifier, and a first comparator, the driver circuit is connected to the control circuit, the upper bridge switch and the lower bridge switch, one terminal of an inductor is connected between the upper bridge switch and the lower bridge switch, another terminal of the inductor is grounded through a capacitor, the error amplifier is connected to a node between the capacitor and the inductor, the error amplifier multiplies a difference between a voltage of the capacitor and a reference voltage by a gain to output an error amplified signal, the first comparator is connected to the error amplifier to compare the error amplified signal with a slope signal to output a comparing signal, and the adaptive frequency adjusting system comprises:

a clock generator connected to the control circuit, and configured to output a clock signal having a preset frequency to the control circuit and reduce a frequency of the clock signal according to a frequency reducing signal, wherein the control circuit controls the upper bridge switch or the lower bridge switch according to the frequency of the clock signal; and a second capacitor connected to the clock generator, the first comparator and the control circuit;

wherein when the second capacitor determines that a voltage of the slope signal reaches a voltage of the error amplified signal within a maximum on-time of the upper bridge switch according to the comparing signal, the second capacitor outputs a reset signal to the control circuit;

wherein when the second capacitor determines that the voltage of the slope signal fails to reach the voltage of the error amplified signal and the maximum on-time of the upper bridge switch ends according to the comparing signal, the second capacitor determines that a duty ratio of an input voltage of the upper bridge switch to a voltage of the node reaches a maximum duty ratio of the frequency of the clock signal, and the second capacitor outputs the reset signal to the control circuit and the frequency reducing signal to the clock generator at an end point of the maximum on-time;

wherein the reset signal instructs the control circuit to control the driver circuit to turn off the upper bridge switch and turn on the lower bridge switch.

2. The adaptive frequency adjusting system according to claim 1, wherein the power converter further includes a voltage divider circuit connected between the error amplifier and the capacitor, the voltage divider divides the voltage of the capacitor to generate a feedback voltage, and the error amplifier multiplies a difference between the feedback voltage and the reference voltage by a gain to output the error amplified signal.

3. The adaptive frequency adjusting system according to claim 1, wherein the control circuit outputs a pulse width modulation signal according to the clock signal to control the upper bridge switch or the lower bridge switch.

4. An adaptive frequency adjusting system for a power converter having a high duty ratio, wherein the power converter includes a control circuit, a driver circuit, an upper bridge switch, a lower bridge switch, an error amplifier, and a first comparator, the driver circuit is connected to the control circuit, the upper bridge switch and the lower bridge switch, one terminal of an inductor is connected between the upper bridge switch and the lower bridge switch, another terminal of the inductor is grounded through a capacitor, the error amplifier is connected to a node between the capacitor and the inductor, the error amplifier multiplies a difference between a voltage of the capacitor and a reference voltage by a gain to output an error amplified signal, the first comparator is connected to the error amplifier to compare the error amplified signal with a slope signal to output a comparing signal, and the adaptive frequency adjusting system comprises:

an on-time generator circuit connected to the first comparator and configured to determine an on-time of the upper bridge switch to output an upper bridge conducting signal according to the comparing signal;

a falling edge detector circuit connected to the on-time generator circuit and the control circuit, and configured to output a reset signal at a time point of a falling edge of the upper bridge conducting signal for instructing the control circuit to control the driver circuit to turn off the upper bridge switch and turn on the lower bridge switch; and a second comparator connected to the first comparator, the falling edge detector circuit and the on-time generator circuit, and wherein when the second capacitor determines that the voltage of the error amplified signal reaches the voltage of the slope signal within a minimum off-time starting from a falling edge of the upper-bridge conducting signal according to the comparing signal, the second capacitor determines that a duty ratio of an input voltage received by the upper bridge switch to the voltage of the capacitor reaches a maximum duty ratio, and outputs an on-time extending signal for instructing the on-time generator circuit to extend the on-time.

5. The adaptive frequency adjusting system according to claim 4, further comprising:

an off-time detector circuit connected to the falling edge detector circuit and the second comparator, and configured to detect the minimum off-time of the upper-bridge conducting signal and provide the minimum off-time to the second comparator.

6. The adaptive frequency adjusting system according to claim 4, wherein the power converter further includes a voltage divider circuit connected between the error amplifier and the capacitor, the voltage divider divides the voltage of the capacitor to generate a feedback voltage, and the error amplifier multiplies a difference between the feedback voltage and the reference voltage by a gain to output the error amplified signal.

* * * * *